(12) United States Patent
Aggarwal et al.

(10) Patent No.: US 7,941,698 B1
(45) Date of Patent: May 10, 2011

(54) SELECTIVE AVAILABILITY IN PROCESSOR SYSTEMS

(75) Inventors: Nidhi Aggarwal, Sunnyvale, CA (US); Norman Paul Jouppi, Palo Alto, CA (US); Parthasarathy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 12/252,144

(22) Filed: Oct. 15, 2008

Related U.S. Application Data (60) Provisional application No. 61/049,151, filed on Apr. 30, 2008.

(51) Int. Cl.
*G06F 11/00* (2006.01)
(52) U.S. Cl. ............................................ 714/11; 714/10
(58) Field of Classification Search .................... 714/10, 714/11
See application file for complete search history.

(56) References Cited

U.S. PATENT DOCUMENTS

| | | | |
|---|---|---|---|
| 7,328,371 B1* | 2/2008 | Kalyanasundharam et al. ............................... | 714/11 |
| 7,711,941 B2* | 5/2010 | Henry et al. ....................... | 713/1 |
| 2002/0046324 A1* | 4/2002 | Barroso et al. ................. | 711/122 |
| 2002/0165961 A1* | 11/2002 | Everdell et al. ................. | 709/225 |
| 2005/0015659 A1* | 1/2005 | Pomaranski et al. ............ | 714/11 |
| 2005/0055608 A1* | 3/2005 | Shidla et al. ..................... | 714/25 |
| 2006/0123018 A1* | 6/2006 | Ashok et al. .................... | 707/100 |
| 2006/0212677 A1* | 9/2006 | Fossum ............................. | 712/1 |
| 2007/0088979 A1* | 4/2007 | Pomaranski et al. ............ | 714/10 |
| 2007/0277023 A1* | 11/2007 | Weiberle et al. .............. | 712/229 |
| 2008/0148015 A1* | 6/2008 | Takamoto et al. ............ | 712/203 |
| 2008/0148034 A1* | 6/2008 | Henry et al. ....................... | 713/1 |
| 2009/0070552 A1* | 3/2009 | Kanstein et al. ................ | 712/29 |
| 2009/0089790 A1* | 4/2009 | Manczak et al. .............. | 718/104 |
| 2009/0113240 A1* | 4/2009 | Vera et al. ........................ | 714/17 |
| 2009/0164767 A1* | 6/2009 | Kanso et al. ....................... | 713/1 |
| 2009/0164826 A1* | 6/2009 | Kottke .......................... | 713/375 |
| 2009/0240979 A1* | 9/2009 | Campini et al. ................ | 714/11 |
| 2010/0004841 A1* | 1/2010 | Mueller et al. ................ | 701/101 |

FOREIGN PATENT DOCUMENTS

WO     WO 03050624 A1 *  6/2003

OTHER PUBLICATIONS

Aggarwal, Nidhi et al. "Configurable Isolation: Building High Availability Systems with Commodity Multi-Core Processors", ISCA '07, Jun. 9-13, 2007.

(Continued)

*Primary Examiner* — Scott T Baderman
*Assistant Examiner* — Chae Ko (57) ABSTRACT

Processor operating methods and integrated circuits are described. According to one embodiment, an integrated circuit includes a processor configured to execute a first application and to redundantly execute a second application while executing the first application, the first application being different from the second application. According to another embodiment, a processor operating method includes receiving a request to execute an application using a processor having a plurality of processor cores. The method also includes, in response to the receiving, determining whether the application should be executed redundantly or non-redundantly, non-redundantly executing the application using one processor core of the plurality if the determining comprises determining that the application should be executed non-redundantly, and redundantly executing the application using two or more processor cores of the plurality if the determining comprises determining that the application should be executed redundantly.

19 Claims, 5 Drawing Sheets

OTHER PUBLICATIONS

Aggarwal, Nidhi et al. "Reconfiguration in a Multi-Core Processor System with Configurable Isolation"; U.S. Provisional Patent Application.

Bernick, David et al."NonStop Advanced Architecture"; Proceedings of the 2005 International Conference on Dependable Systems and Networks (DSN '05), 2005 IEEE.

Bressoud, Thomas C. and Schneider, Fred B."Hypervisor-Based Fault-Tolerance"; ACM Transactions on Computer Systems, vol. 14, No. 1. Feb. 1996, pp. 80-107.

Gold, Brian T. et al. "Truss: A Reliable, Scalable Server Architecture," IEEE Nov./Dec. 2005 pp. 51-59.

Gomaa, M. et al., "Transient-Fault Recovery for Chip Multiprocessors," International Symposium on Computer Architecture, 2003.

Kumar, Rakesh et al, "Single-ISA Heterogeneous Multi-Core Architectures for Multithreaded Workload Performance"; In Proceedings of the 31st International Symposium on Computer Architecture, Jun. 2004.

Srinivasan, Jayanth et al. "The Impact of Technology Scaling on Lifetime Reliability"; Proceedings of "The International Conference on Dependable Systems and Networks (DSN-04)," Jun. 2004

U.S. Appl. No. 11/787,881 Inventor: Aggarwal, Nidhi et al., filed Apr. 17, 2007.

Aggarwal, Nidhi et al. "Altering a Degree of Redundancy Used During Execution of an Application"; U.S. Appl. No. 12/250,367, filed Oct. 13, 2008.

* cited by examiner

SELECTIVE AVAILABILITY IN PROCESSOR SYSTEMS

CROSS-REFERENCE TO RELATED APPLICATIONS

This patent application claims the benefit of priority under 35 U.S.C. §119(e) to U.S. Provisional patent application Ser. No. 61/049,151, filed Apr. 30, 2008, entitled "Selective Availability In Processor Systems," having the same inventors and which is hereby incorporated by reference in its entirety.

FIELD OF THE DISCLOSURE

Aspects of the disclosure relate to selective availability in processor systems.

BACKGROUND OF THE DISCLOSURE

Monolithic integrated circuit chips may include more than one processor core. Such chips may be referred to as chip multiprocessors. Chip multiprocessors may use one processor core of the chip multiprocessor to execute instructions of a first application and may simultaneously use another processor core of the chip multiprocessor to execute instructions of a second application. Doing so may reduce an amount of time used to execute the instructions of the first and second applications when compared to a chip having a single processor core that multiplexes execution of instructions of both the first and second applications.

SUMMARY

According to some aspects of the disclosure, methods and integrated circuits for selective availability in processor systems are described.

According to one embodiment, an integrated circuit includes a processor configured to execute a first application and to redundantly execute a second application while executing the first application, the first application being different from the second application.

According to another embodiment, a processor operating method includes receiving a request to execute an application using a processor. The processor includes a plurality of processor cores. In response to the receiving, the method includes determining whether the application should be executed redundantly or non-redundantly, non-redundantly executing the application using one processor core of the plurality if the determining comprises determining that the application should be executed non-redundantly, and redundantly executing the application using two or more processor cores of the plurality if the determining comprises determining that the application should be executed redundantly.

Other embodiments are described as is apparent from the following discussion.

DETAILED DESCRIPTION

Attention is directed to the following commonly assigned applications, which are incorporated herein by reference: U.S. Patent Application No. 61/049,173 entitled "Reconfiguration in a Multi-Core Processor System with Configurable Isolation" naming Nidhi Aggarwal, Norman Paul Jouppi, and Parthasarathy Ranganathan as inventors and having assignee, which is incorporated herein by reference; U.S. Patent Application No. 61/049,141 entitled "Altering a Degree of Redundancy Used During Execution of an Application" naming Nidhi Aggarwal, Norman Paul Jouppi, and Parthasarathy Ranganathan as inventors and having assignee docket no. 200703065-1, which is incorporated herein by reference; and U.S. patent application Ser. No. 11/787,881 entitled "Chip Multiprocessor with Configurable Fault Isolation" naming Nidhi Aggarwal, Norman Paul Jouppi, and Parthasarathy Ranganathan as inventors which is incorporated herein by reference.

The present disclosure is directed towards computers, processors, and methods of operating or configuring processors in example embodiments. According to some aspects of the disclosure, integrated circuits and processor operating methods execute applications using varying degrees of redundancy. Some applications may be non-redundantly executed and other applications may be redundantly executed. The degree of redundancy (e.g., no redundancy, dual mode redundancy, triple mode redundancy, etc.) used in executing a particular application may be determined based on one or more of a plurality of criteria.

In some embodiments, the criteria may be related to or based upon the application and/or the hardware executing the application. For example, the determining may be based on a delay sensitivity characteristic of the application, an error sensitivity characteristic of the application, or a time of execution characteristic of the application. The determining may alternatively or additionally be based on a plurality of processor cores executing the application. For example, the determining may be based on a load characteristic of one or more of the processor cores, an ambient error rate of one or more of the processor cores, or an availability of one or more of the processor cores in some illustrative embodiments.

Figure 1:
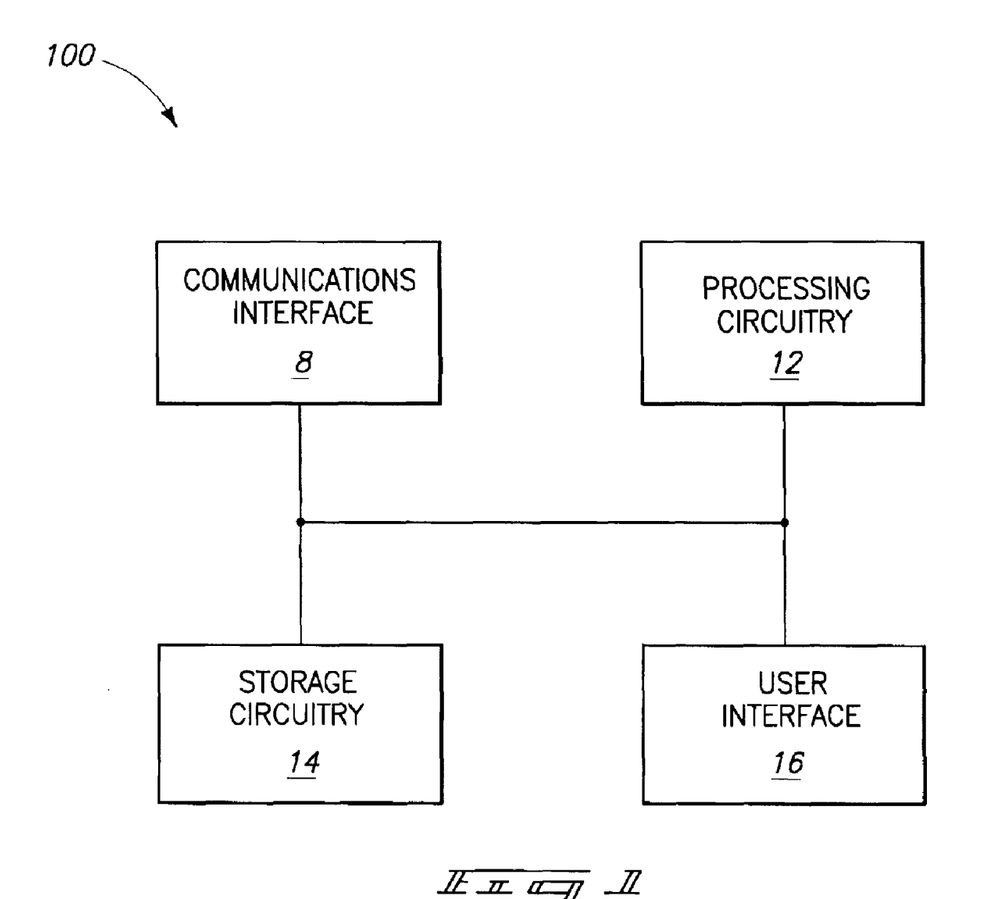
FIG. 1 is a block diagram of a computer according to one embodiment.

Referring to FIG. 1, a computer 100 is illustrated. Computer 100 includes a communications interface 8, processing circuitry 12, storage circuitry 14, and a user interface 16.

Communications interface 8 may enable computer 100 to communicate with other devices (e.g., other computers). For example, communications interface 8 may be a network interface.

Processing circuitry 12 may comprise circuitry configured to implement desired programming provided by appropriate media in at least one embodiment. For example, processing circuitry 12 may be implemented as one or more of a processor and/or other structure configured to execute executable instructions including, for example, software and/or firmware instructions, and/or hardware circuitry. Exemplary embodiments of processing circuitry 12 include hardware logic, PGA, FPGA, ASIC, state machines, and/or other structures alone or in combination with a processor. These examples of processing circuitry 12 are for illustration and other configurations are possible.

In one specific example, a processor of processing circuitry 12 may include a plurality of modules that may perform the same and/or different functions of the processor. For example, the modules may include a processor core module which processes data (e.g., executes instructions), a cache memory module which stores data used by a processor core module, a memory controller module which facilitates an exchange of data between a cache memory module and an external memory device, and an input/output (I/O) controller module which enables a processor core module to communicate with other devices. In one more specific example embodiment, the processor is a multiprocessor that includes a plurality of the same type of modules (e.g., processor core modules). In another example, only one type of a module is present in the processor.

Furthermore, the processor may take a number of different physical forms. In one embodiment, the processor may be a single monolithic integrated circuit chip. The single monolithic integrated circuit chip may include one or more processor cores. In some embodiments, if the single monolithic integrated circuit chip includes more than one processor core, the integrated circuit may be referred to as a chip multiprocessor.

In another embodiment, the processor may include more than one integrated circuit chip. For example, the processor may include a plurality of integrated circuit chips and one or more of the integrated circuit chips of the plurality may include a plurality of processor cores.

In one embodiment, processing circuitry 12 may configure the processor to execute applications including operating systems and/or virtual machines. In fact, in one embodiment, the processor may execute more than one operating system or virtual machine. In doing so, processing circuitry 12 may act as a hypervisor and/or virtual machine monitor and may use hypervisor-based process pairing or other techniques. Alternatively or additionally, processing circuitry 12 may configure the processor to execute an application redundantly.

In one embodiment, processing circuitry 12 may monitor and/or configure the processor. The portions of processing circuitry 12 configured to monitor and/or configure the processor may be part of the processor itself and/or may be circuitry separate from the processor (e.g., a separate processor). In one embodiment, processing circuitry 12 may configure the processor to execute a first application using a first degree of redundancy and, while the first application is being executed by the processor, configure the processor to execute a second application using a second degree of redundancy. For example, processing circuitry 12 may configure the processor to non-redundantly execute the first application using a single processor core and may configure the processor to redundantly execute the second application using, for example, two processor cores.

Storage circuitry 14 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information. In one embodiment, storage circuitry 14 may store programming implemented by processing circuitry 12.

At least some embodiments or aspects described herein may be implemented using programming stored within appropriate processor-usable media and configured to control appropriate processing circuitry. For example, programming may be provided via appropriate media including, for example, embodied within articles of manufacture.

User interface 16 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface may include a display (e.g., cathode ray tube, LCD, etc.) configured to depict visual information and an audio system as well as a keyboard, mouse and/or other input device. Any other suitable apparatus for interacting with a user may also be utilized.

Figure 1A:
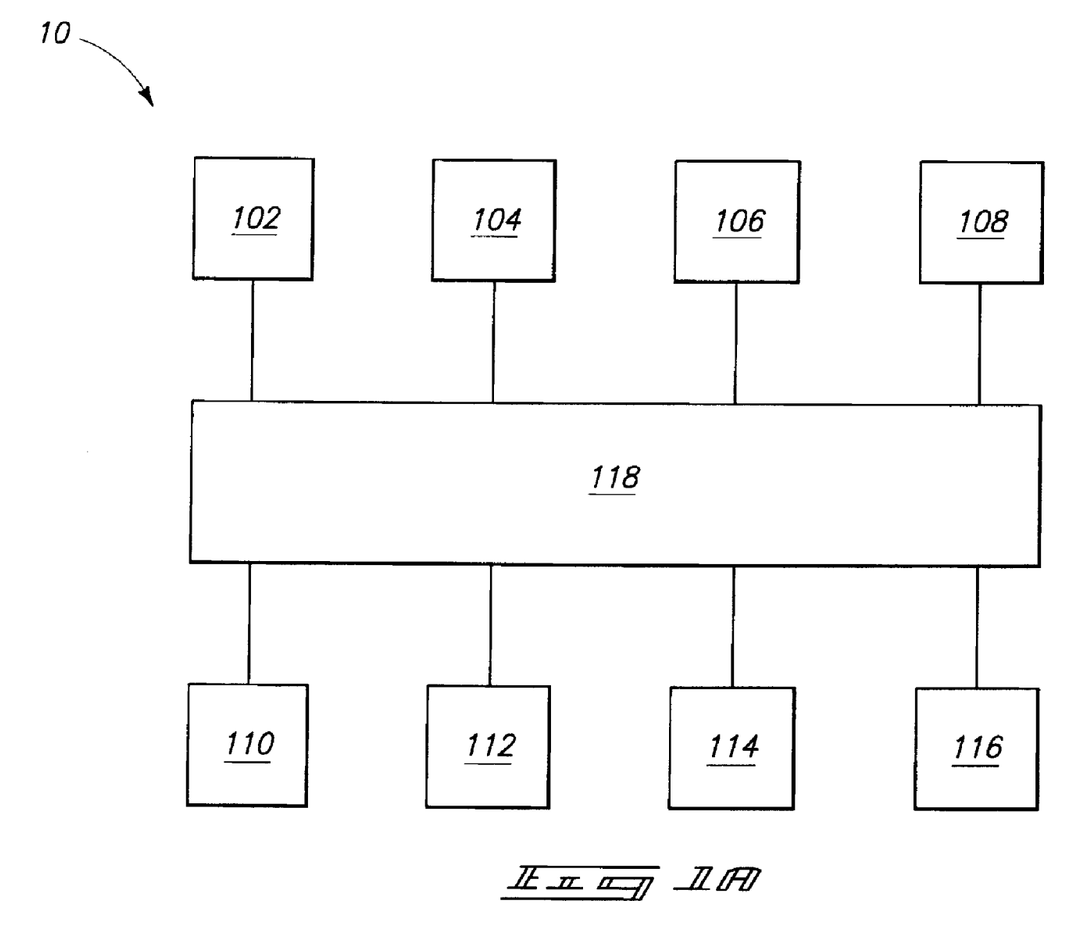
FIG. 1A is a block diagram of a processor according to one embodiment.

Referring to FIG. 1A, one embodiment of a processor 10 of processing circuitry 12 is illustrated. Processor 10 includes modules 102, 104, 106, 108, 110, 112, 114, and 116 and interconnection circuitry 118. As mentioned above, the modules of processor 10 may perform functions of the processor. For example, the modules of processor 10 may be processor cores, cache memories, memory controllers, or I/O controllers. Interconnection circuitry 118 may enable communication between the modules.

In one embodiment, module 102 may be a processor core and module 110 may be a cache memory. Accordingly, module 110 may store data and instructions and module 102 may retrieve the instructions from module 110 via interconnection circuitry 118 and may execute the instructions. In doing so, module 102 may retrieve data from module 110 via interconnection circuitry 118 and/or write data to module 110 via interconnection circuitry 118.

In one embodiment, the modules of processor 10 may be associated with each other in a particular way in order to communicate with each other. For example, module 102 may be associated with module 110 so that module 102 and module 110 may communicate with each other. Specifically, module 110 may store instructions and data and may provide the instructions and data to module 102. Module 102 may provide data to module 110. Similarly, in one embodiment, modules 104, 106, and 108 may be processor cores that are associated respectively with modules 112, 114, and 116, which may be cache memories.

In one embodiment, modules 102, 104, 106, and 108 may perform the same function (e.g., processing instructions) but may perform the function using different data. For example, modules 102 and 104 may both be processor cores that execute instructions and module 102 may execute the same or different instructions than module 104. Similarly, modules 112, 114, 116, and 118 may perform the same function (e.g., storing data and instructions) and may perform the function using the same or different data. For example, modules 110 and 112 may both be cache memories that store instructions and data, and module 110 may store the same or different instructions and data than module 112.

In one embodiment, one or more of the modules of processor 10 may be a different integrated circuit chip and interconnection circuitry 118 may be a network or bus connecting the different chips together. In another embodiment, the modules of processor 10, as well as interconnection circuitry 118, may be included in a single monolithic integrated circuit chip.

Interconnection circuitry 118 may enable communication between the modules of processor 10. In one embodiment, interconnection circuitry 118 may enable each module of processor 10 to communicate with every other module of processor 10. In another embodiment, interconnection circuitry 118 may enable each module of processor 10 to communicate with some of the other modules of processor 10, but not all of the other modules of processor 10. In one embodiment, interconnection circuitry 118 may selectively enable communication between the modules of processor 10.

Processing circuitry 12 may control and/or configure the modules of processor 10 to execute applications. For example, processing circuitry 12 may control and/or configure each module of processor 10 to execute a different application. In one embodiment, processing circuitry 12 may configure one module of processor 10 to execute a first application, for example, module 102. Processing circuitry 12 may also control and/or configure two other modules of processor 10 (e.g., modules 104 and 106) to redundantly execute a second application.

Modules 104 and 106, in one configuration, may both execute the same instance of the second application and therefore may be executing substantially the same instructions. In another embodiment, modules 104 and 106 may each execute a different instance of the second application, where each instance may be executing the second application based on different data.

Processing circuitry 12 may frequently compare results of the execution of the second application by module 104 with results of the execution of the second application by module 106 to determine whether the results from the two modules are the same. The execution may proceed if the results are the same or are otherwise satisfactory. If the results are not the same, processing circuitry 12 may configure modules 104 and 106 to back up to a checkpoint and re-execute the second application from the checkpoint. This configuration may be referred to as a dual mode redundant configuration.

Other degrees of redundancy are also possible. For example, processing circuitry 12 may determine that the second application should be executed using triple mode redundancy and may therefore configure modules 104, 106, and 108 to execute the second application.

Processing circuitry 12 or a voter (described further below) may frequently compare results of the execution of the second application by module 104 with results of the execution of the second application by module 106 and results of the execution of the second application by module 108 to determine whether the results from the three modules are the same. If all three results are not the same, but two of the results are the same, processing circuitry 12 may use the result that two of the modules agreed on. This technique may be referred to as forward error recovery. Consequently, the execution of the second application need not be backed up to a checkpoint. As a result, using triple mode redundancy to execute an application may be faster than using dual mode redundancy to execute the application.

In one configuration, processor 10 may execute a first application using redundancy but may use a single module. For example, processing circuitry 12 may configure module 102 to execute a first application redundantly. In this configuration, module 102 may execute the first application from a first checkpoint to a second checkpoint and store the results of the execution. Module 102 may then execute the first application from the first checkpoint to the second checkpoint again and compare the result from this second execution of the first application with the stored result from the first execution of the first application. If the results agree, module 102 may then redundantly execute the first application from the second checkpoint to a third checkpoint, from the third checkpoint to a fourth checkpoint, and so on. In this manner a single module, module 102, may redundantly execute the first application.

In one embodiment, the single module may non-redundantly execute a second application in addition to redundantly executing the first application. In this embodiment, the single module may multiplex instructions of the first and second applications during a period of time. Accordingly, the single module may execute a portion of the first application during a first fraction of the period of time, redundantly execute the portion of the first application again during a second fraction of the period of time, and execute a portion of the second application during a third fraction of the period of time.

In yet another configuration, module 102 may be capable of redundantly executing an application using dual pipelining. In this configuration, module 102 may include two pipelines and may use each of the two pipelines to redundantly execute instructions of an application within module 102. Some circuitry of module 102 may be shared by both pipelines, nevertheless, dual pipelining may provide some protection against errors. Consequently, processor 10 may redundantly execute the application using a single module, module 102, rather than using a plurality of the modules of processor 10.

In determining a degree of redundancy with which to execute the second application, processing circuitry 12 may use one or more criteria. As mentioned above, individual criterion, in one embodiment, may be related to a characteristic of the application itself or to a characteristic of processor 10. Criteria used to determine the degree of redundancy with which to execute the second application are discussed in more detail below.

Figure 2:
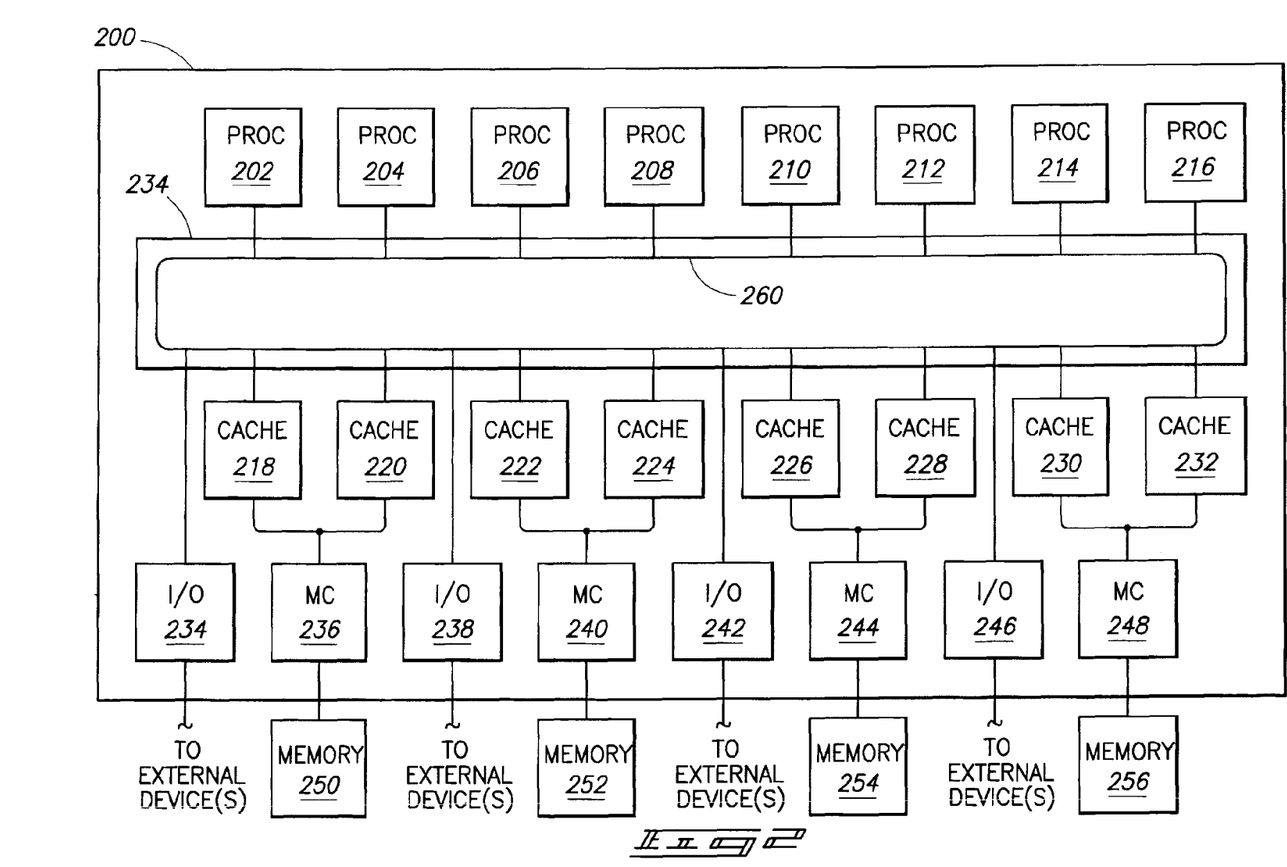
FIG. 2 is a block diagram of a processor according to one embodiment.

Referring to FIG. 2, another embodiment of a processor is illustrated. In this embodiment, the processor is a single monolithic integrated circuit chip 200 having four different types of modules: processor cores, cache memories, memory controllers, and I/O controllers. Chip 200 includes eight processor cores 202, 204, 206, 208, 210, 212, 214, and 216 and eight cache memories 218, 220, 222, 224, 226, 228, 230, and 232. In addition, chip 200 includes four memory controllers 236, 240, 244, and 248 and four I/O controllers 234, 238, 242, and 246. Chip 200 also includes interconnection circuitry 234.

Four external memories 250, 252, 254, and 256 are also depicted in FIG. 2. External memories 250, 252, 254, 256 may store instructions that may be executed by the processing cores of chip 200 and may also store data associated with the execution of the instructions. External memories 250, 252, 254, and 256 may be physically distinct from chip 200 in one embodiment. In other words, external memories 250, 252, 254, and 256 may be implemented as one or more integrated circuit chips distinct from chip 200.

Memory controllers 236, 240, 244, and 248 may facilitate the transfer of data (e.g., data lines) between the cache memories of chip 200 and external memories 250, 252, 254, and 256. In one embodiment, one memory controller may be shared by two of the cache memories of chip 200. For example, memory controller 236 may communicate both with cache memory 218 and cache memory 220.

Cache memories 218, 220, 222, 224, 226, 228, 230, and 232 may store data and instructions retrieved from external memories 250, 252, 254, and 256 via memory controllers 236, 240, 244, and 248. In addition, the cache memories of chip 200 may store data received from the processor cores of chip 200. Memory controllers 236, 240, 244, and 248 may subsequently store the data received from the processor cores of chip 200 in external memories 250, 252, 254, and 256.

Processor cores 202, 204, 206, 208, 210, 212, 214, and 216 may execute instructions retrieved from the cache memories of chip 200. In doing so, the processor cores may use data stored in the cache memories of chip 200 and may write data resulting from the executing of the instructions into the cache memories. In one configuration, each processor core of chip 200 may execute instructions that are independent and/or different from instructions executed by the other processor cores of chip 200. For example, processor core 202 may execute a set of instructions (e.g., of a first application) and processor core 204 may independently execute a different set of instructions (e.g., or a second application). Alternatively, processor cores 202 and 204 may redundantly execute the same set of instructions, perhaps independent of each other, without interacting with each other in one embodiment.

I/O controllers 234, 238, 242, and 246 may facilitate communication between a processor core of chip 200 and a device external to chip 200 such as another processor or a voter (described further below). In one embodiment, two processor cores may share one I/O controller. For example, I/O controller 234 may communicate via interconnection circuitry 234 with both processor core 202 and processor core 204.

The modules of chip 200 may be associated with each other in a particular way. For example, processor core 202 may be associated with and/or may communicate with cache memory 218, memory controller 236, and I/O controller 234. Similarly, processor core 204 may be associated with cache memory 220, memory controller 236, and I/O controller 234; processor core 206 may be associated with cache memory 222, memory controller 240, and I/O controller 238; processor core 208 may be associated with cache memory 224, memory controller 240, and I/O controller 238; processor core 210 may be associated with cache memory 226, memory controller 244, and I/O controller 242; processor core 212 may be associated with cache memory 228, memory controller 244, and I/O controller 242; processor core 214 may be associated with cache memory 230, memory controller 248, and I/O controller 246; and processor core 216 may be associated with cache memory 232, memory controller 248, and I/O controller 246. In one embodiment, these associations may be reconfigurable.

Interconnection circuitry 234 may enable communication between the processor cores, cache memories, I/O controllers, and memory controllers of chip 200. As is depicted in FIG. 2, in one embodiment, interconnection circuitry 234 may be a ring 260. Other embodiments of interconnection circuitry 234 are also possible. For example, interconnection circuitry 234 may be a mesh or a cross bar.

Chip 200 may execute a plurality of applications simultaneously. For example, processor core 202, cache memory 218, memory controller 236, and I/O controller 234 may execute a first application and processor core 204, cache memory 220, memory controller 236, and I/O controller 234 may simultaneously execute a different second application. In one embodiment, chip 200 may execute applications non-redundantly. In other words, one of the processor cores of chip 200 may execute an application and other processor cores of chip 200 might not be used to execute the application.

In order to execute an application redundantly, in some embodiments the modules of chip 200 may be allocated among a plurality of fault domains. Fault domains may be defined and used to isolate groups of modules from each other so that faults occurring while executing an application in one fault domain are prevented from causing faults or errors to occur in another fault domain.

Figure 2A:
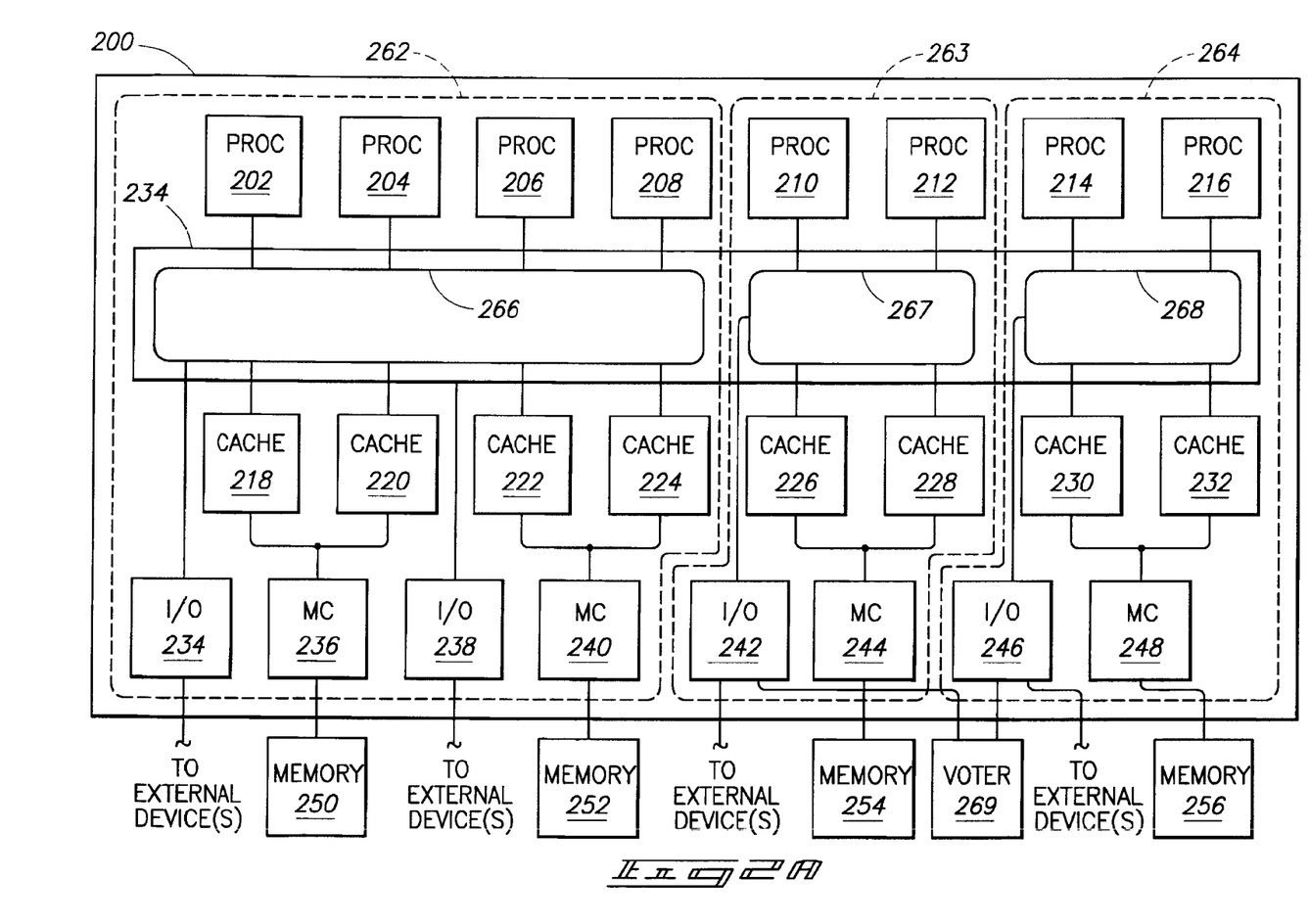
FIG. 2A is a block diagram of a processor according to one embodiment.

Referring to FIG. 2A, a configuration of chip 200 implementing three fault domains 262, 263, and 264 is illustrated. Fault domain 262 includes the following modules of chip 200: processor cores 202, 204, 206, and 208; cache memories 218, 220, 222, and 224; I/O controllers 234 and 238; and memory controllers 236 and 240. In addition, fault domain 262 includes a ring 266 of interconnection circuitry 234. Ring 266 enables communication between the modules of fault domain 262 and, in this embodiment, may provide fault isolation between modules of fault domain 262 and modules of fault domains 263 and 264. For example, ring 266 may prevent modules of fault domain 262 from directly communicating with modules of fault domains 263 and 264.

Fault domain 263 includes the following modules of chip 200: processor cores 210 and 212; cache memories 226 and 228; I/O controller 242; and memory controller 244. In addition, fault domain 263 includes a ring 267 of interconnection circuitry 234. Ring 267 enables communication between the modules of fault domain 263 and, in this embodiment, may provide fault isolation between modules of fault domain 263 and modules of fault domains 262 and 264.

Fault domain 264 includes the following modules of chip 200: processor cores 214 and 216; cache memories 230 and 232; I/O controller 246; and memory controller 248. In addition, fault domain 264 includes a ring 268 of interconnection circuitry 234. Ring 268 enables communication between the modules of fault domain 264 and, in this embodiment, may provide fault isolation between modules of fault domain 264 and modules fault domains 262 and 263.

Fault domain 262 may be isolated from fault domains 263 and 264 in that a failure of one of the modules associated with fault domain 262 (e.g., memory controller 236) may be prevented from affecting the modules associated with fault domain 264.

In one embodiment, a single application may be redundantly executed in both fault domain 263 and fault domain 264, thereby providing dual mode redundancy. For example, processor core 210 may execute the application and processor core 214 may also execute the same application. More particularly, processor core 214 may execute the same instance of the application as processor core 210. Accordingly, processor core 210 and processor core 214 may redundantly execute instructions of the application and may do so in isolation from each other so that errors encountered while executing the application using processor core 210 (e.g., errors caused by radiation such as alpha particles) do not affect the redundant execution of the application performed by processor core 214.

At particular points in the execution, the results of executing the application on processor core 210 may be compared with results of executing the application on processor core 214.

For example, processor core 210 may forward results of executing the application to I/O controller 242, which may forward the results to a voter 269. Similarly, processor core 214 may forward results of executing the application to I/O controller 246, which may then forward the results to voter 269. Voter 269 may then compare the execution results from processor core 210 with the execution results from processor core 214.

If neither processor core 210 nor processor core 214 encountered an error while executing the application, the results of executing the application on processor core 210 should be the same as the results of executing the application on processor core 214. If the results are not the same, processing circuitry 12 may return processor core 210 and processor core 214 to a checkpoint in the application at which processor cores 210 and 214 had matching results and the application may be re-executed from the checkpoint.

In one embodiment, chip 200 may initially be configured as illustrated in FIG. 2. Processing circuitry 12 may re-configure chip 200 by allocating the modules of chip 200 into the fault domains illustrated by FIG. 2A. In one embodiment, processing circuitry 12 may configure chip 200 using the Advanced Configuration and Power Interface (ACPI) specification. Of course, processing circuitry 12 may re-configure chip 200 to have fault domain allocations other than those illustrated by FIG. 2A. In general, processing circuitry 12 may alter the number of fault domains and the number of modules of chip 200 allocated to the fault domains. Processing circuitry 12 may re-configure chip 200 at boot time or may re-configure chip 200 during operation of chip 200.

Once processing circuitry 12 has re-configured chip 200 to have the fault domains illustrated by FIG. 2A, processing circuitry 12 may then configure chip 200 to non-redundantly execute a first application in a first fault domain (e.g., fault domain 262) and to redundantly execute a second application in second and third fault domains. In one embodiment, Chip 200 may execute the second application while executing the first application. In this embodiment, faults occurring during the execution of the first application may be contained to the first fault domain. Similarly, faults occurring during the execution of the second application in the second fault domain may be contained to the second fault domain and faults occurring during the execution of the second application in the third fault domain may be contained to the third fault domain. An application may also be redundantly executed by one or more processor cores of a single fault domain on some embodiments.

In one embodiment, the first application might not need to be redundantly executed. Accordingly, non-redundantly executing the first application while redundantly executing the second application may be desirable since doing so may conserve resources of chip 200 as compared to redundantly executing both the first application and the second application. For example, by non-redundantly executing the first application, chip 200 may be able to non-redundantly execute a third application simultaneous with the first and second applications.

In another embodiment, processing circuitry 12 may configure processor core 202 to non-redundantly execute a first application and may further configure processor core 202 to redundantly execute a second application. Processor core 202 may redundantly execute the second application using the techniques described above in relation to FIG. 1A. Thus, a non-redundantly executed application and a redundantly executed application may both be executed in the same or different fault domains.

However, processing circuitry 12, in one embodiment, may analyze a first application that is to be executed non-redundantly prior to assigning the first application to a same fault domain as a redundantly executed second application to determine whether the first application is likely to delay the execution of the second application. Doing so may help ensure that the processors redundantly executing the second application reach checkpoints of the second application at approximately the same time, thereby preventing one processor redundantly executing the second application from waiting at a checkpoint a significant amount of time for another processor redundantly executing the second application to reach the checkpoint. In one embodiment, the analyzing may include determining memory and/or I/O requirements of the first application.

In one embodiment, chip 200 may be configured to have more than two fault domains so that an application may be executed using triple mode redundancy within respective different fault domains. Alternatively, two or more processor cores of a single fault domain may redundantly execute the application.

Figure 2B:
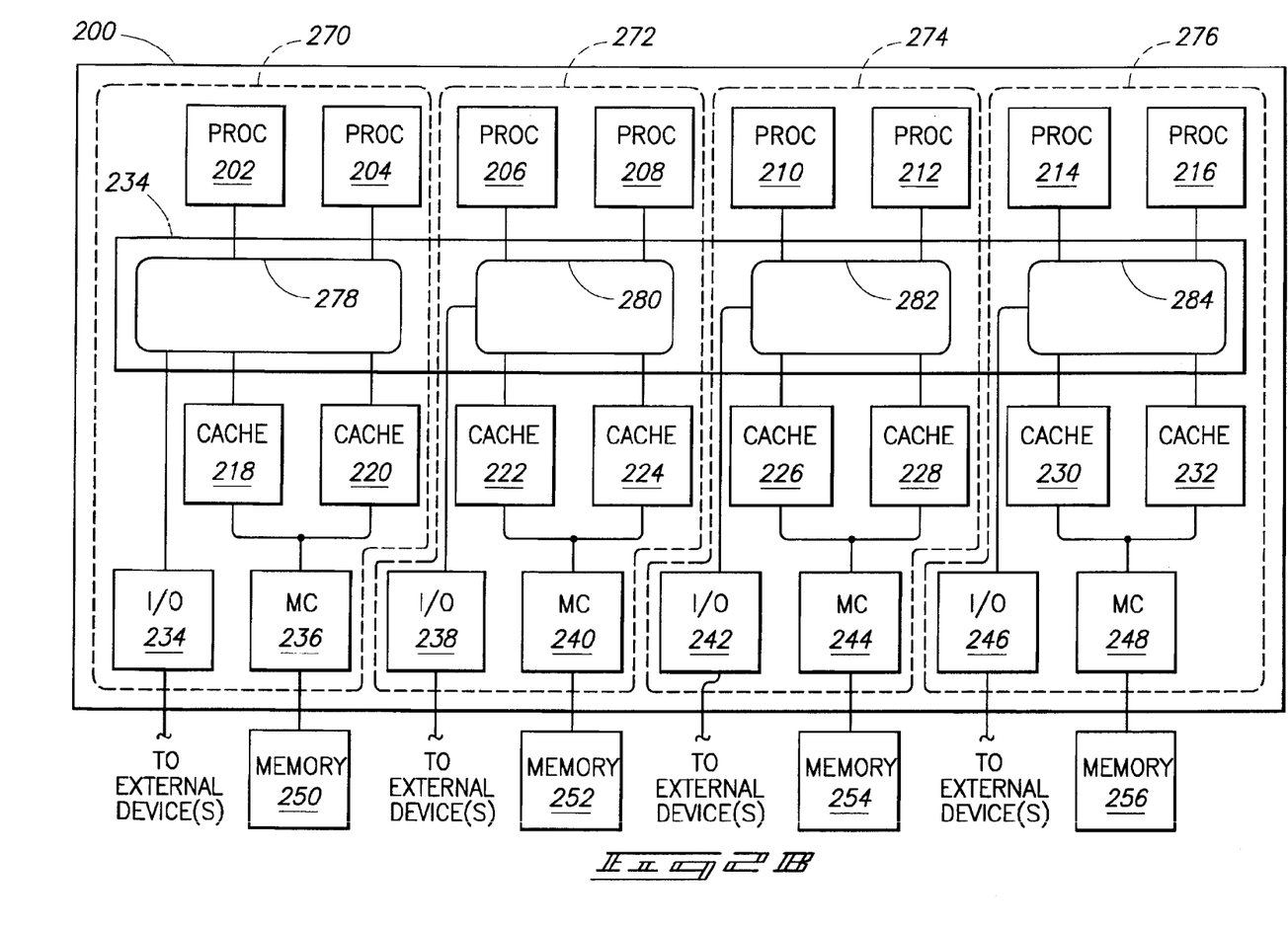
FIG. 2B is a block diagram of a processor according to one embodiment.

Referring to FIG. 2B, a configuration of chip 200 implementing four fault domains 270, 272, 274, and 276 is illustrated. The modules of chip 200 are allocated among fault domains 270, 272, 274, and 276 as illustrated by FIG. 2B. Interconnection circuitry 234 may be configured to have four different rings 278, 280, 282, and 284. Ring 278 may enable communication between modules of fault domain 270 and may provide fault isolation between modules of fault domain 270 and modules of chip 200 belonging to other fault domains. Rings 280, 282, and 284 may similarly enable communication within their respective fault domains. As was discussed above, fault domains 270, 272, 274, and 276 may be isolated from each other in that a failure occurring in one of the fault domains may be prevented from affecting the execution of an application in a different fault domain.

In one embodiment, processing circuitry 12 may configure processor core 202 of fault domain 270 to non-redundantly execute a first application and may configure processor cores 206 and 210 of fault domains 272 and 274 respectively to redundantly execute a second application while processor core 202 executes the first application. Processor cores 206 and 210 may independently execute instructions of the second application. The first and second applications may be different from each other.

Of course, while chip 200 is executing the first application and the second application, chip 200 may be simultaneously executing other applications. For example, at one moment in time, processor core 202 may be non-redundantly executing the first application, processor cores 206, 210, and 214 may be redundantly executing the second application using triple mode redundancy, processor core 204 may be non-redundantly executing a third application, and processor cores 212 and 214 may be redundantly executing a fourth application using dual mode redundancy.

In one embodiment, processing circuitry 12 may receive a request to execute an application using chip 200. In response to receiving the request, processing circuitry 12 may determine whether the application should be executed redundantly or non-redundantly. Processing circuitry 12 may make the determination based on characteristics of the application, characteristics of chip 200, or other factors as described below. If processing circuitry 12 determines that the application should be executed non-redundantly, processing circuitry 12 may configure a processor core of chip 200 (e.g., processor core 202) to execute the application.

If processing circuitry 12 determines that the application should be executed redundantly, processing circuitry 12 may configure two or more processor cores of chip 200 (e.g., processor cores 206 and 210) to redundantly execute the application. In one embodiment, the two or more processor cores may each be allocated to the same or different fault domains. For example, one of the processor cores may be processor core 206 of fault domain 272 and the other processor core may be processor core 210 of fault domain 274.

In one embodiment, processing circuitry 12 may configure one processor core of a fault domain (e.g., processor core 208 of fault domain 272) to non-redundantly execute a first application, another processor core of the fault domain (e.g., processor core 206 of fault to main 272) to execute a second application, and a processor core of another fault domain (e.g., processor core 210 of fault domain 274) to also execute the second application.

In one embodiment, after determining that the application should be executed redundantly, processing circuitry 12 may configure two or more processor cores of chip 200 (e.g., processor cores 206, 210, and 214) to redundantly execute the application. Furthermore, processing circuitry 12 may prevent the two or more processor cores from executing other applications in order to prevent other applications from interacting with the application.

Processing circuitry 12 may further protect the application by reconfiguring chip 200 so that each of the two or more processor cores redundantly executing the application are allocated respectively to two or more fault domains and no other processor cores are allocated to the two or more fault domains.

As mentioned above, processing circuitry 12 may determine the degree of redundancy with which an application is to be executed based on one or more criteria related to characteristics of the application, characteristics of chip 200, or other factors. For example, in one embodiment, processing circuitry 12 may determine the degree of redundancy based on any one of a plurality of criteria being satisfied. In another embodiment, processing circuitry 12 may determine the degree of redundancy based on a plurality of criteria being satisfied.

Some criteria may be related to characteristics of chip 200. In one embodiment, a first criterion may be related to load characteristics of one or more of the processor cores of chip 200. In one embodiment, the load characteristic of a processor core may be related to a number of applications being executed by or waiting to be executed by the processor core during a recently expired period of time.

For example, at a point in time processing circuitry 12 may determine a load characteristic evaluated during a period of the 5 minutes immediately prior to the point of time for each of the processor cores of chip 200. If one or more of the load values are above a threshold, processing circuitry 12 may conclude that chip 200 is currently heavily loaded and that processing circuitry 12 should not configure chip 200 to execute the application redundantly since doing so may reduce the number of applications that chip 200 is able to execute because some modules of chip 200 will be redundantly executing a same single application rather than independently executing two or more different applications.

In one embodiment, another criterion may be related to availability characteristics of one or more of the modules of chip 200. In one embodiment, the availability characteristic of a module may be related to whether or not the module is operational. If the module is operational, it may be available to process instructions. However, if the module is non-operational, it might not be available to process instructions. Modules of chip 200 may become non-operational over time, for example, due to wear out. Alternatively, some modules of chip 200 may become non-operational with respect to a first virtual machine of a virtualized environment if the modules are allocated to a second virtual machine of the virtualized environment.

Processing circuitry 12 may determine how many of the modules of chip 200 are unavailable. In one configuration, processing circuitry 12 may compare the number of unavailable modules to a threshold. If the number exceeds the threshold, processing circuitry 12 may determine that the application should be non-redundantly executed because chip 200 may have reduced capacity due to the unavailable modules. If the number does not exceed the threshold, processing circuitry 12 may determine that the application should be redundantly executed.

In one embodiment, another transition criterion may be related to an error rate of one or more of the processor cores of chip 200. In one embodiment, the error rate of a processor core may be related to a number of soft errors (e.g., errors induced by radiation such as alpha particles) experienced by the processor core. In some cases, the error rate may be related to an elevation above sea level of a chip 200 since radiation induced errors may increase as elevation above sea level increases.

For example, processing circuitry 12 may determine an ambient error rate for one or more of the processor cores of chip 200. If one or more of the error rates are above a threshold, processing circuitry 12 may subsequently determine that the application should be redundantly executed in order to detect and correct errors made by the processor cores.

In one embodiment, another criterion may be related to a power supply providing power to chip 200. For example, if chip 200 is powered by a battery, processing circuitry 12 may determine that the application should be executed non-redundantly in order to conserve power. Executing an application non-redundantly may consume less power than executing the application redundantly since the application may be executed more than once when executed redundantly.

Other criteria may be related to the application itself. In one embodiment, such criterion may be related to an error sensitivity characteristic of the application. For example, the application may be a banking application that updates account balances. To ensure accuracy while updating the account balances, the application may have an error sensitivity characteristic indicating that the application is highly sensitive to errors. Upon determining that the application is highly sensitive to errors, processing circuitry 12 may determine that the application should be redundantly executed in order to remedy any error that may occur while executing the application.

In one embodiment, another criterion may be related to a delay sensitivity characteristic of the application. For example, if the application is a real-time communications application (e.g., an audio or video communications application), the application may involve encoding communication information. To avoid delay while encoding the communication information, the application may have a delay sensitivity characteristic indicating that the application is highly sensitive to delay. Upon determining that the application is highly sensitive to delay, processing circuitry 12 may determine that the application should be executed using triple mode redundancy so that if errors are detected while executing the application, the errors may be corrected using forward error recovery as was described above. Using triple mode redundancy may be preferable to dual mode redundancy in this case since correcting an error using dual mode redundancy may involve backing up the application to a checkpoint and re-executing the application from the checkpoint, which may introduce a significant delay not incurred when using triple mode redundancy and forward error recovery.

In one embodiment, another criterion may be related to a date and/or time range. For example, the application may have a characteristic specifying that during a particular period of time the application is to be executed redundantly. The particular period of time may, in one embodiment, be a particular portion of a day, for example, a portion of the day during which a backup operation is performed. In one embodiment, the particular period of time may span a time period during which particularly sensitive information may be processed by the application. Alternatively, an operator may specify that applications initiated during the date and/or time range should be executed redundantly.

Processing circuitry 12 may, in one embodiment, compare a current date and/or time with the date and/or time range. If the current date and/or time falls within the range, processing circuitry 12 may determine that the application should be executed redundantly (or alternatively, non-redundantly) and if the current date and/or time falls outside the range processing circuitry 12 may determine that the application should be executed non-redundantly (or alternatively, redundantly).

In one embodiment, another transition criterion may be related to a service level agreement of the application. The service level agreement may specify that the application is to be executed redundantly. Processing circuitry 12 may determine that the application should be executed redundantly based on the service level agreement.

Processing circuitry 12 may determine degrees of redundancy for a plurality of applications that are to be executed by chip 200. In doing so, processing circuitry 12 may re-configure fault domains of chip 200 as needed to accommodate applications that processing circuitry 12 determines should be executed redundantly. In one embodiment, processing circuitry 12 may increase the number of fault domains if the number of applications to be executed redundantly increases with respect to the number of applications to be executed non-redundantly. Likewise, processing circuitry 12 may reduce the number of fault domains of chip 200 if the number of applications to be executed non-redundantly increases with respect to the number of applications to be executed redundantly.

For example, returning to FIG. 2A, processing circuitry 12 may configure processor cores of fault domain 262 to non-redundantly execute applications and may configure processor cores of fault domains 263 and 264 to redundantly execute applications. If processing circuitry 12 determines that fault domains 263 and 264 are not able to execute additional applications due to loading, processing circuitry 12 may re-configure chip 200 by, for example, creating two additional fault domains and allocating modules from fault domain 262 (e.g., processor cores 206 and 208) to the two additional fault domains.

Furthermore, processing circuitry 12 may adjust the numbers of modules of chip 200 allocated to fault domains of chip 200 so that chip 200 may efficiently execute a particular blend of redundant and non-redundant applications.

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An integrated circuit comprising:
a processor configured to execute a first application and to execute a second application while executing the first application, the first application being different from the second application; and
the integrated circuit further comprises processing circuitry configured to determine whether the first and second applications should be executed redundantly or non-redundantly based on a quantity of applications being executed by or waiting to be executed by the processor.

2. The integrated circuit of claim 1 wherein:
the processor comprises a plurality of processor cores; and
the processing circuitry is configured to:
configure a first one of the processor cores of the plurality to execute the first application; and
configure at least a second one of the processor cores of the plurality to redundantly execute the second application.

3. The integrated circuit of claim 1 wherein the second application comprises a set of instructions and the processor is configured to independently execute the set of instructions on each of two different processor cores.

4. The integrated circuit of claim 1 wherein the processor comprises one processor core and the one processor core is configured to non-redundantly execute the first application and redundantly execute the second application.

5. A processor operating method comprising:
receiving a request to execute an application using a processor, the processor comprising a plurality of processor cores;
in response to the receiving, determining whether the application should be executed redundantly or non-redundantly based on a quantity of applications being executed by or waiting to be executed by the processor;
non-redundantly executing the application using one processor core of the plurality if the determining comprises determining that the application should be executed non-redundantly; and
redundantly executing the application using two or more processor cores of the plurality if the determining comprises determining that the application should be executed redundantly.

6. The method of claim 5 further comprising, prior to the determining, allocating the processor cores of the plurality among a plurality of fault domains, individual fault domains of the plurality containing faults occurring within the individual fault domain to the individual fault domain and wherein the one processor Core of the plurality is allocated to a different fault domain than the two or more processor cores of the plurality.

7. The method of claim 6 further comprising, after the determining, changing the allocation of the processor cores of the plurality among the plurality of fault domains based on the determining.

8. The method of claim 6 wherein the two or more processor cores are allocated to respective different ones of the fault domains of the plurality.

9. The method of claim 6 wherein the one processor core and only one of the two or more processor cores are both allocated to a same fault domain of the plurality.

10. The method of claim 6 wherein the one processor core and the two or more processor cores are allocated to respective different ones of the fault domains of the plurality.

11. The method of claim 5 wherein the determining comprises determining based on a characteristic of the plurality of processor cores.

12. The method of claim 5 wherein the determining comprises determining based on a characteristic of the plurality of the application.

13. The method of claim 5 wherein the determining comprises determining that the application should be executed redundantly and further comprising after the determining, preventing additional applications from being assigned to the two or more processor cores while the two or more processor cores redundantly execute the application.

14. The method of claim 5 wherein the determining comprises comparing an error sensitivity characteristic of the application to a threshold.

15. The method of claim 5 wherein the determining comprises comparing an ambient error rate of one or more of the processor cores of the plurality to a threshold.

16. The method of claim 5 wherein the determining comprises determining based on how many of the plurality of processor cores are available to process instructions.

17. The method of claim 5 wherein the determining comprises determining that the application should be executed redundantly using three processor cores of the plurality based on a delay sensitivity characteristic of the application.

18. A processor operating method comprising:
    allocating a first processor core to a first fault domain, a second processor core to a second fault domain, and a third processor core to a third fault domain and a fourth processor core to a fourth fault domain;
    executing a first application on the first processor core;
    determining that a second application should be executed redundantly using three processor cores based on a delay sensitivity characteristic of the second application;
    during the executing of the first application, redundantly executing a second application on the second processor core, and the third processor core, and the fourth processor core; and
    containing first faults occurring within the first fault domain to the first fault domain, second faults occurring within the second fault domain to the second fault domain, third faults occurring within the third fault domain to the third fault domain, and fourth faults occurring within the fourth fault domain to the fourth fault domain.

19. The method of claim 18 wherein the first processor core, the second processor core, and the third processor core are all processor cores of a single monolithic integrated circuit.

* * * * *

UNITED STATES PATENT AND TRADEMARK OFFICE
CERTIFICATE OF CORRECTION

PATENT NO. : 7,941,698 B1
APPLICATION NO. : 12/252144
DATED : May 10, 2011
INVENTOR(S) : Nidhi Aggarwal et al.

It is certified that error appears in the above-identified patent and that said Letters Patent is hereby corrected as shown below:

In column 14, line 32, in Claim 6, delete "Core" and insert -- core --, therefor.

In column 15, line 10, in Claim 18, after "domain," delete "and".

In column 16, line 3, in Claim 18, after "core," delete "and".

Signed and Sealed this
Thirteenth Day of March, 2012

David J. Kappos
*Director of the United States Patent and Trademark Office*